No. 790,742. PATENTED MAY 23, 1905.
T. R. PALMER.
VEHICLE TIRE.
APPLICATION FILED DEC. 17, 1904.

Witnesses:
H. S. Gaither
C. A. Mullen

Inventor:
Thron R. Palmer
by Chamberlin & Wilkinson Attys

No. 790,742. Patented May 23, 1905.

UNITED STATES PATENT OFFICE.

THERON R. PALMER, OF ERIE, PENNSYLVANIA.

VEHICLE-TIRE.

SPECIFICATION forming part of Letters Patent No. 790,742, dated May 23, 1905.

Application filed December 17, 1904. Serial No. 237,202.

*To all whom it may concern:*

Be it known that I, THERON R. PALMER, a citizen of the United States, residing at Erie, State of Pennsylvania, have invented a certain new and useful Improvement in Vehicle-Tires; and I declare the following to be a full, clear, and exact description of the invention, such as will enable others skilled in the art to which it pertains to make and use the same, reference being had to the accompanying drawings, which form a part of this specification.

My invention has for its object the production of a vehicle-tire of the class known as the "double-tube," in which there is an inner tube adapted to be inflated and an outer casing adapted to be engaged to the rim.

The particular object of the invention is to provide a means for preventing the outer casing from "creeping" on the rim—that is, moving longitudinally around the rim.

Figure 1:
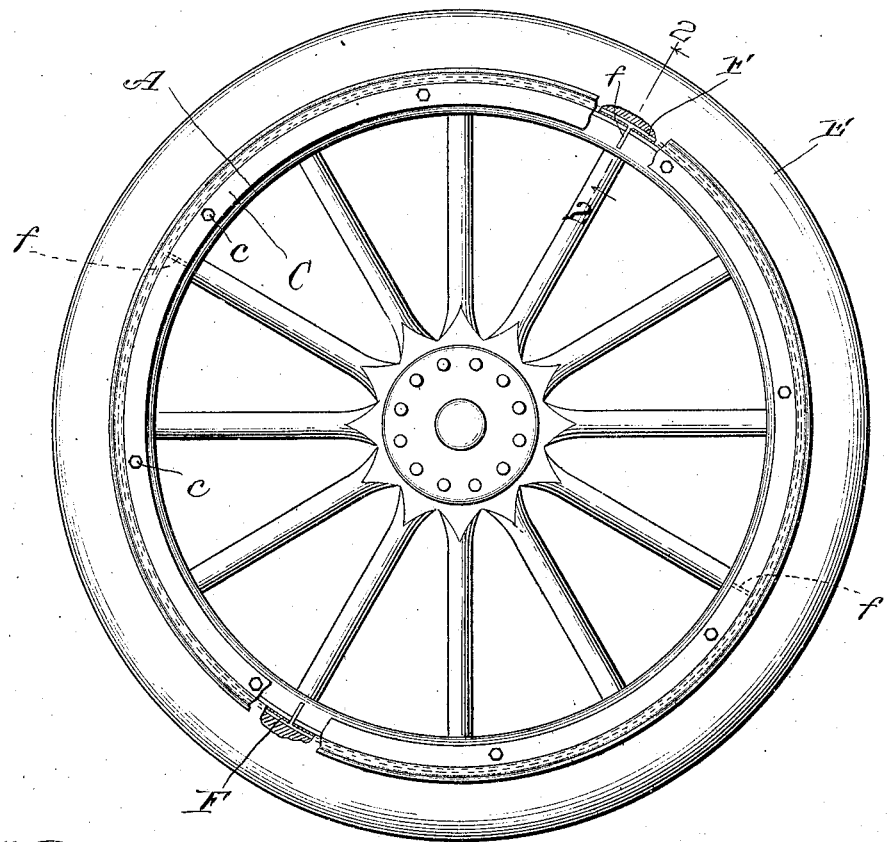
Figure 2:
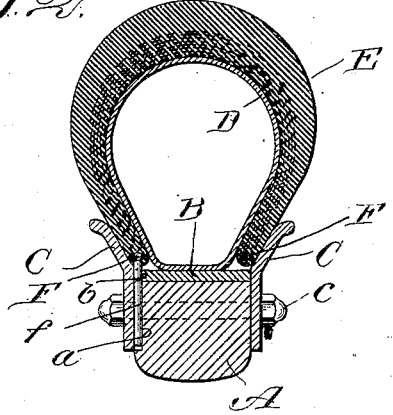
Figure 3:
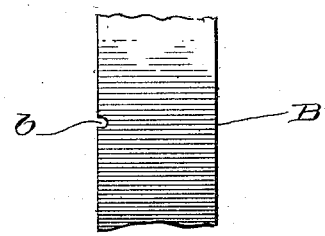

In the drawings, Figure 1 is a side elevation of a wheel with my tire thereon. Fig. 2 is a section on the line 2 2. Fig. 3 is an elevation of a portion of the rim.

In carrying out the invention A represents the wood felly of a wheel; B, the metal rim thereon; C, side flanges held to the felly and rim by bolts $c$ passed through the felly; D, the inner tube, and E the outer casing. Around each longitudinal edge of the outer casing are wires F, adapted to hold the casing in place when the inner tube is inflated, the flanges C preventing any lateral movement of said edges.

In order to prevent the creeping of the casing E, I provide in the edge of the rim B a notch $b$, in the side face of the felly A a groove or recess $a$, and on the wire F a downward projection $f$, adapted to fit into the notch $b$ and groove $a$ when the casing is in place. This projection may be, if desired, made integral with the wire F, or it may be suitably engaged thereto. There may also be any number of these projections $f$, and I have shown herein two on each edge wire of the casing, the two on one side being opposite each other (with relation to the diameter of the wheel) and those on one edge staggered with respect to those on the other edge.

It will be seen that from the above description when the casing is in place and the side flanges C bolted on the casing is held from movement in any direction; but upon the removal of one of the flanges C the projections $f$ on that edge of the casing can be readily lifted from their seats and the edge of the casing detached.

It is of course obvious that the length of the projections $f$ may be varied without departing from the spirit of the invention.

While my invention is particularly adapted for use in connection with double-tube vehicle-tires, yet it may be used with advantage in connection with single-tube tires or solid-rubber tires.

What I claim as new, and desire to secure by Letters Patent, is—

1. The combination with a vehicle-tire, of a wheel around which the tire is detachably located, projections extending inwardly from the tire-engaging grooves in the vertical face of the wheel-felly, and a flange detachably secured to the vertical face of the felly for retaining said projections within said grooves.

2. The combination with a vehicle-tire, of a wheel around which the tire is detachably located, projections extending inwardly from each side of the base of the tire closely engaging grooves in the vertical faces of the wheel-felly, and flanges detachably secured to the vertical faces of the felly for retaining said projections within said grooves.

3. The combination with a vehicle-tire, of a metallic rim surrounding the felly of the wheel, a tire detachably surrounding said rim, projections extending inwardly from each side of said tire engaging radial grooves in the vertical faces of the wheel-felly, and notches in the edges of said rim registering with said grooves, and flanges detachably secured to the vertical faces of the felly for retaining said projections within said grooves and notches.

4. The combination with a vehicle-wheel, of a metallic rim surrounding the felly of the wheel, a double-tube pneumatic tire detachably surrounding said rim, circumferential wires secured to each edge of the casing of said tire, projections extending inwardly from said wires engaging radial grooves in the vertical faces of the wheel-felly and notches in the edges of said rim, and detachable flanges secured to the vertical faces of the wheel-felly for retaining said projections within said grooves and notches.

In testimony whereof I sign this specification in the presence of two witnesses.

THERON R. PALMER.

Witnesses:
J. E. REED,
JOHN L. WELLS.